Figure 1:
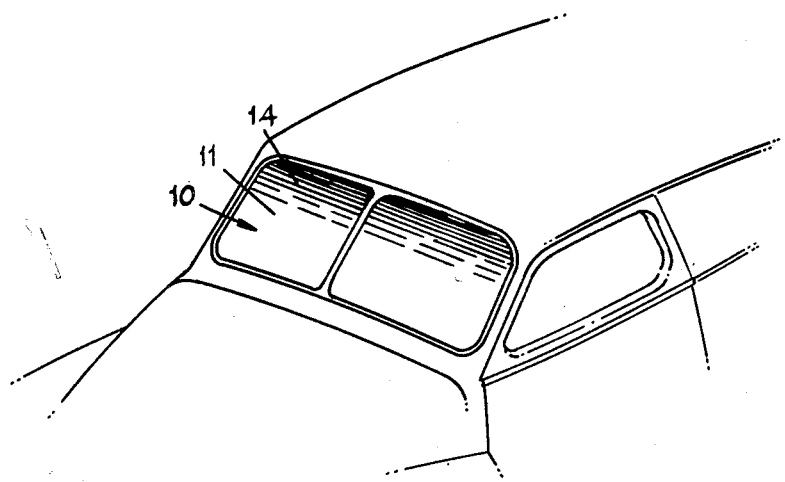

Nov. 11, 1958   R. C. MOLTER ET AL   2,860,059
ULTRA-VIOLET LIGHT ABSORBING GLASS
Filed Sept. 3, 1953

INVENTORS
Richard C. Molter and
BY Howard R. Swift
Nobbe & Swope
ATTORNEYS

2,860,059

ULTRA-VIOLET LIGHT ABSORBING GLASS

Richard C. Molter and Howard R. Swift, Toledo, Ohio, assignors to Libbey-Owens-Ford Glass Company, Toledo, Ohio, a corporation of Ohio Application September 3, 1953, Serial No. 378,374

3 Claims. (Cl. 106—52)

This invention relates generally to absorbing glasses and more particularly to practically colorless glasses that may be used to protect materials from ultraviolet light.

Briefly stated, this invention embodies a new and improved ultra-violet light absorbing glass which is of utility not only in conventional glazing applications but which may also be used in automotive windshields and windows.

At the present time, it is customary to use a greenish-blue ultra-violet absorbing glass in safety glass automotive windshields in combination with a plastic interlayer having a colored glare reducing portion which is graduated to give a desirable shading effect, the purpose of the absorbing glass being to protect the colored shaded portion of the plastic against fading due to the ultra-violet rays of the sun. Although the use of the above mentioned tinted glass has met with substantial acceptance in automotive applications, there has developed a need for a substantially colorless glass having high ultra-violet light absorption as well as high visible light transmittance properties.

It is therefore a primary object of the present invention to provide a substantially colorless ultra-violet absorbing glass having a relatively high visible light transmittance combined with a relatively high ultra-violet absorption characteristic.

Another object of the invention is the provision of a substantially colorless ultra-violet light absorbing glass of the above character which is of particular utility when used in conjunction with colored plastic interlayers in the manufacture of safety glass automotive windshields and the like.

While a primary use of ultra-violet light absorbing glass has been in automotive windshields, the improved glass herein provided is not limited to such applications as it may be utilized in the glazing of store windows and the like. Heretofore, various means such as golden tinted transparent plastic filter shades or tinted absorbing glass have been employed to protect clothing and other display items in display windows from the ultra-violet light fading effects of the sun. However, the use of these plastic filter shades and tinted absorbing glasses has been found to be objectionable because of the reduced visibility, and the unnatural hue given to the articles on display, and where, from a selling point of view it is advantageous to have the articles appear in their natural colors.

It is therefore a further object of this invention to provide an economical substantially colorless ultra-violet light absorbing glass that may be used to glaze store fronts and the like.

Other objects and advantages of the invention will become more apparent during the course of the following description when taken in connection with the accompanying drawings.

Figure 2:
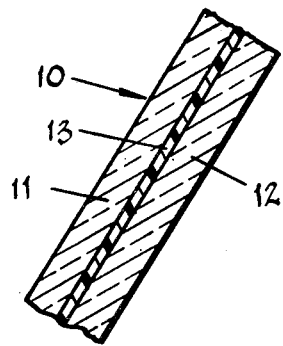

In the accompanying drawings, wherein like numerals are employed to designate like parts throughout the same:

Fig. 1 is a fragmentary perspective view of an automobile having a windshield including the improved glass of the present invention; and Fig. 2 is a fragmentary sectional view of the windshield thown in Fig. 1.

Referring more particularly to the drawings, Fig. 1 illustrates a use of our invention in an automotive windshield which is designated 10. As shown in Fig. 2, the windshield comprises generally two sheets of glass 11 and 12 bonded to an intermediate layer of plastic 13 which preferably consists of a sheet of polyvinyl butyral resin.

As best shown in Fig. 1, the layer of plastic 13 is provided with a colored band 14 extending across the upper portion of the windshield. This colored band, having a colored area of gradually decreasing light transmittance, provides a built-in glare screen for the windshield as more fully illustrated and described in Patent 2,636,420, issued April 28, 1953. It has been found that such an anti-glare screen serves to effectively protect the driver of the automobile from the glare of the sun.

As beforementioned, it has been found desirable in such a windshield to employ an ultra-violet light absorbing glass, at least for the outer glass sheet 11, to protect the colored glare-reducing band 14 from the fading and other injurious effects of the sun. In developing an absorbing glass of this type having the necessary visible light transmittance quality, it was heretofore considered commercially expedient to add ultra-violet cut-off materials which gave a decided greenish-blue tint to the glass.

Now, however, we have developed a new substantially colorless ultra-violet light absorbing glass which is superior in both ultra-violet absorption and in visible light transmittance to the greenish-blue protective glass presently used for this purpose. For example, the following table shows the relative ultra-violet transmittance values of three different glasses, one of which is the protecting glass of our new colorless, ultra-violet absorbing composition. The ultra-violet transmittance data is on the basis of using the sun's energy and an air mass of two.

[U. V. transmittance (0.1325 inch thick).]

| | Percent |
|---|---|
| New colorless glass | 51.3 |
| Present tinted glass | 57.0 |
| Regular plate glass | 75.0 |

From the above table, it will be noted that our new glass has a very high ultra-violet absorbing quality. The ultra-violet absorption of the new glass is approximately 6% higher than the greenish-blue tinted glass now being used in many automobile windshields and is approximately 24% higher than conventional plate glass.

A comparison of visible light transmittance is also given below wherein our composition is shown to be superior to the present tinted glass in visible light transmittance qualities and very close to that of regular plate glass.

[Ill. A transmittance (.280 inch laminated).]

| | Percent |
|---|---|
| New colorless glass | 86.1 |
| Present tinted glass | 72.0 |
| Regular plate glass | 88.6 |

From the above table, it is to be noted that our new glass is approximately 14% higher in visible light transmittance than the conventional greenish-blue tinted glass. In fact, it approaches regular plate glass in the amount of visible light transmitted.

According to our invention, we utilize an ordinary soda-lime-silica glass to which certain materials are added which render the finished glass capable of cutting off ultra-violet light while allowing substantially all of the effective luminous rays to pass through the glass. The ultra-violet cut-off materials herein employed consist of commercial ceric oxide and commercial titanium dioxide combined with commercial ferric oxide in predetermined relative amounts and added to a base glass batch during the melting cycle.

By way of example, the following base glass batch may be satisfactorily used, although the invention is not limited to these particular ingredients or specific glass composition resulting therefrom.

| | Pounds |
|---|---|
| Sand | 1000 |
| Calcium limestone | 215 |
| Dolomitic limestone | 125 |
| Soda ash | 305 |
| Soda niter | 50 |

The above batch is an ordinary soda-lime-silica plate glass batch and adapted to be added to this batch during the melting cycle are the following ultra-violet cut-off materials and colorants which are typical of a weight proportion within the scope of the invention.

| | Pounds |
|---|---|
| Ceric oxide | 1.5 |
| Titanium dioxide | 3.9 |
| Ferric oxide | 5.5 |

The addition of these ultra-violet cut-off materials and colorants to the above base batch in the approximate amounts given will result in a finished glass having substantially the following composition:

| | Percent |
|---|---|
| $SiO_2$ | 72.2 |
| $Fe_2O_3$ | 0.42 |
| $Al_2O_3$ | 0.1 |
| $TiO_2$ | 0.29 |
| CaO | 11.2 |
| MgO | 2.0 |
| $Na_2O$ | 13.7 |
| $CeO_2$ | 0.076 |

While the above example is typical of the cut-off and coloring materials used, the invention is not limited to these specific percentages of titanium, cerium, and iron oxides. We have found that the most desirable amount of ultra-violet absorption and visible light transmittance can be obtained within a definite range of the materials as follows:

| | Percent |
|---|---|
| $CeO_2$ | 0.05 to 0.50 |
| $TiO_2$ | 0.19 to 1.90 |
| $Fe_2O_3$ | 0.20 to 0.60 |

We have found it desirable but not essential to melt the glass under oxidizing conditions either by adding oxidizing agents to the batch or by maintaining oxidizing atmosphere over the glass melt. Likewise, we have found that the base glass batch given above is capable of being modified in different ways without changing the effectiveness of the cerium, titanium, and iron. For instance, the calcium limestone in the batch may be partially replaced by dolomitic limestone or arsenic trioxide may be added to the batch as is common practice in the art of glass making.

By utilizing relatively low levels of ceric oxide and titanium dioxide in combination with moderately high ferric oxide contents we have developed a substantially colorless absorbing glass having the very desirable properties of high visible light transmittance and high ultra-violet light absorption. We have been able by the addition of proper amounts of the above mentioned cut-off materials to a conventional glass composition to produce a glass which is extremely desirable in automotive windshields and store windows where good ultra-violet absorption and high visible light transmittance characteristics are desirable.

It is to be understood that the form of the invention disclosed herein is to be taken as the preferred embodiment thereof, and that various changes may be resorted to without departing from the spirit of the invention or the scope of the following claims.

We claim:
1. A clear substantially colorless transparent soda-lime silica glass having high ultra-violet ray absorbing qualities and high visible light transmittance qualities including as essential ingredients from 0.05% to 0.50% $CeO_2$, 0.19% to 1.90% $TiO_2$, and 0.20% to 0.60% $Fe_2O_3$.

2. A batch for making a clear substantially colorless transparent soda-lime silica glass having high ultra-violet ray absorbing characteristics and high visible light transmittance qualities comprising essentially the following ingredients in substantially the weight proportions given:

| | Pounds |
|---|---|
| Sand | 1000 |
| Calcium limestone | 215 |
| Dolomitic limestone | 125 |
| Soda ash | 305 |
| Soda niter | 50 |
| Ceric oxide | 1.5 |
| Titanium dioxide | 3.9 |
| Ferric oxide | 5.5 |

3. A clear transparent substantially colorless soda-lime silica high ultra-violet absorbing glass having high visible light transmittance qualities consisting of substantially 72.2% $SiO_2$, 0.1% $Al_2O_3$, 11.2% CaO, 2.0% MgO, 13.7% $Na_2O$, and the remainder including from 0.05% to 0.50% $CeO_2$, 0.19% to 1.90% $TiO_2$, and 0.20% to 0.60% $Fe_2O_3$.

References Cited in the file of this patent

UNITED STATES PATENTS

| 2,444,976 | Brown | July 13, 1948 |
|---|---|---|
| 2,636,420 | Ryan et al. | Apr. 28, 1953 |